(12) United States Patent
Mei et al.

(10) Patent No.: US 12,088,421 B2
(45) Date of Patent: Sep. 10, 2024

(54) CONTROL METHOD AND CONTROL APPARATUS FOR COMMUNICATION DEVICE, AND COMMUNICATION SYSTEM AND STORAGE MEDIUM

(71) Applicants: GD MIDEA HEATING & VENTILATING EQUIPMENT CO., LTD., Foshan (CN); MIDEA GROUP CO., LTD., Foshan (CN)

(72) Inventors: Lijun Mei, Foshan (CN); Liangwei Sun, Foshan (CN); Tian Wu, Foshan (CN); Guofeng Liu, Foshan (CN)

(73) Assignees: GD MIDEA HEATING & VENTILATING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 17/922,974

(22) PCT Filed: Sep. 10, 2021

(86) PCT No.: PCT/CN2021/117575
§ 371 (c)(1),
(2) Date: Nov. 3, 2022

(87) PCT Pub. No.: WO2022/121410
PCT Pub. Date: Jun. 16, 2022

(65) Prior Publication Data
US 2023/0239167 A1 Jul. 27, 2023

(30) Foreign Application Priority Data
Dec. 9, 2020 (CN) .......................... 202011430827.8

(51) Int. Cl.
*H04L 12/12* (2006.01)
*F24F 11/54* (2018.01)
*F24F 11/88* (2018.01)

(52) U.S. Cl.
CPC .............. *H04L 12/12* (2013.01); *F24F 11/54* (2018.01); *F24F 11/88* (2018.01)

(58) Field of Classification Search
CPC ............ H04L 12/12; F24F 11/88; F24F 11/54
See application file for complete search history.

(56) References Cited

U.S. PATENT DOCUMENTS 5,974,553 A * 10/1999 Gandar ................... H04L 25/02
713/320
2007/0208470 A1 9/2007 Itabashi et al.
(Continued)

FOREIGN PATENT DOCUMENTS

CN 103365388 A 10/2013
CN 206596011 U 10/2017
(Continued)

OTHER PUBLICATIONS

ISR mailed Dec. 8, 2021 of PCT Application No. PCT/CN2021/117575.
(Continued)

*Primary Examiner* — Henry Tsai
*Assistant Examiner* — Harry Z Wang

(57) ABSTRACT

The present disclosure provides a control method and a control apparatus for a communication device, a communication system, and a storage medium. The control method for a communication device includes periodically outputting, a first level signal and a second level signal to the communication bus, and the second communication device establishes a data connection with the first communication device based on that the level signal on the communication
(Continued)

bus is the first level signal, and the second communication device establishes a power supply connection with the first communication device based on that the level signal on the communication bus is the second level signal. Since the data connection and the power supply connection do not appear at the same time, the communication bus using the above-mentioned control method does not need to set an inductance compared to the traditional Home Bus.

6 Claims, 6 Drawing Sheets

(56) References Cited

U.S. PATENT DOCUMENTS

| | | | | |
|---|---|---|---|---|
| 2007/0233920 | A1* | 10/2007 | Misawa | H04L 12/40045 710/110 |
| 2013/0034172 | A1* | 2/2013 | Pettler | H04L 27/02 375/257 |
| 2013/0070863 | A1* | 3/2013 | Ohl | H04L 12/40045 375/257 |
| 2014/0056388 | A1* | 2/2014 | Mori | H04B 1/10 375/340 |
| 2014/0281077 | A1* | 9/2014 | Biskup | G06F 13/20 710/110 |
| 2018/0367436 | A1* | 12/2018 | Kim | H04L 12/40 |

FOREIGN PATENT DOCUMENTS

| | | |
|---|---|---|
| CN | 109889419 A | 6/2019 |
| CN | 110593655 A | 12/2019 |
| CN | 111343065 A | 6/2020 |
| CN | 112556105 A | 3/2021 |
| EP | 0822684 A1 | 2/1998 |

OTHER PUBLICATIONS

First OA mailed Sep. 28, 2021 of CN Application No. 202011430827.8.
Second OA mailed Jan. 26, 2022 of CN Application No. 202011430827.8.
First search mailed Sep. 10, 2021 of CN Application No. 202011430827.8.
EESR received in EP Application No. 21902118.5; mailed Nov. 23, 2023.

* cited by examiner

CONTROL METHOD AND CONTROL APPARATUS FOR COMMUNICATION DEVICE, AND COMMUNICATION SYSTEM AND STORAGE MEDIUM

CROSS-REFERENCES TO RELATED APPLICATIONS

The present disclosure is a national phase application of International Application No. PCT/CN2021/117575, filed on Sep. 10, 2021, which claims priority to Chinese Patent Application No. 202011430827.8 filed with China National Intellectual Property Administration on Dec. 9, 2020, the entireties of which are herein incorporated by reference.

FIELD

The present disclosure relates to the field of communication control, in particular, to control method and control apparatus for communication device, communication system, and storage medium.

BACKGROUND

The existing air-conditioning communication system uses communication buses such as 485, CAN, Home Bus, PLC, etc. to communicate. However, among the above-mentioned buses, Home Bus and PLC belong to the buses that can provide communication and power supply.

Taking Home Bus as an example, FIG. 1 shows the circuit diagram of Home Bus communication node. When Home Bus communication interface chip sends data, the data to be sent is coupled to the communication bus through the first capacitor E1 and the second capacitor E2. When receiving data, the data on the communication bus is coupled in through the third capacitor C1 and the fourth capacitor C2. If the current node is a power supply node, the DC power supply loads the power supply to the communication bus HA and HB through the transformer L1; if the node is a power taking node, the power is taken from the communication bus through the transformer L1.

In the above-mentioned embodiments, there is always a DC power supply on the communication bus, and data can be coupled according to actual needs. The circuit of the above-mentioned Home Bus communication node has the following problems during use.

Since power and data exist on the communication bus at the same time, it is necessary to block the DC power supply during data interaction, such as using a capacitor to block the DC communication. When a DC signal is required, it is necessary to use the inductors L2 and L3 to pass DC and block AC. Under normal circumstances, the volume of the capacitor is small, and for the controller equipped with the above-mentioned communication system, the impact on its volume is small, while the volume of the inductance is large and belongs to the load, and its design size will affect the volume of the controller and the driving ability of the air-conditioning communication system, and will affect the communication distance and anti-interference ability of the overall air-conditioning communication system.

SUMMARY

In some embodiments of the present disclosure is to provide a first control method for a communication device.

In some embodiments of the present disclosure is to provide a second control method for a communication device.

In some embodiments of the present disclosure is to provide a first control apparatus for a communication device.

In some embodiments of the present disclosure is to provide a second control apparatus for a communication device.

In some embodiments of the present disclosure is to provide a communication system.

In some embodiments of the present disclosure is to provide a readable storage medium.

In view of this, according to some embodiments of the present disclosure, the present disclosure provides the first control method for a first communication device, and the first communication device and the second communication device are connected through a communication bus, and the control method for a communication device includes periodically outputting, a first level signal and a second level signal to the communication bus, and the second communication device establishes a data connection with the first communication device based on that the level signal on the communication bus is the first level signal, and the second communication device establishes a power supply connection with the first communication device based on that the level signal on the communication bus is the second level signal.

In the embodiments of the present disclosure, a first control apparatus for a first communication device is provided, a first communication device and a second communication device are connected through a communication bus, and the control apparatus comprises: a sending device for periodically outputting a first level signal and a second level signal to the communication bus, and the second communication device establishes a data connection with the first communication device based on that a level signal on the communication bus is the first level signal, and the second communication device establishes a power supply connection with the first communication device based on that a level signal on the communication bus is the second level signal.

In the embodiments of the present disclosure, a second control apparatus for a communication device is provided, a second communication device and a first communication device are connected through a communication bus, and the first communication device periodically outputs a first level signal and a second level signal to the communication bus, the control apparatus comprises: a detecting device for detecting a level change signal on the communication bus; and a sending device for sending data to the first communication device based on that a level signal on the communication bus is switched from the second level signal to the first level signal.

In the embodiments of the present disclosure, a communication system is provided, comprising: a first communication device, and the first communication device executes the steps of the control method for a communication device according to any one of the embodiments; and a second communication device, and the second communication device executes the steps of the control method for a communication device according to any one of the embodiments; and a communication bus, and the first communication device and the second communication device are connected through the communication bus.

In the embodiments of the present disclosure, a readable storage medium is provided, comprising: a processor, a memory, and programs or instructions stored on the memory and executable on the processor, the programs or instructions implements the steps of the control method for a communication device according to any one of the embodiments when executed by the processor.

Additional embodiments of the present disclosure will become apparent in the following description or will be learned by practice of the present disclosure.

BRIEF DESCRIPTION OF THE DRAWINGS

The above and/or additional embodiments of the present disclosure will become apparent and readily understood from the description of embodiments in conjunction with the following drawings.

DETAILED DESCRIPTION OF THE DISCLOSURE

In order to understand embodiments of the present disclosure more clearly, the present disclosure will be described in further detail with reference to the accompanying drawings and detailed description. It should be noted that the embodiments and features in the embodiments of the present disclosure may be combined with one another without conflicts.

In the following description, numerous specific details are set forth in order to provide a thorough understanding of the present disclosure, but the present disclosure may be practiced otherwise than as described herein, and therefore, the protection scope of the present disclosure is not limited to the exemplary embodiments disclosed below.

Figure 2:
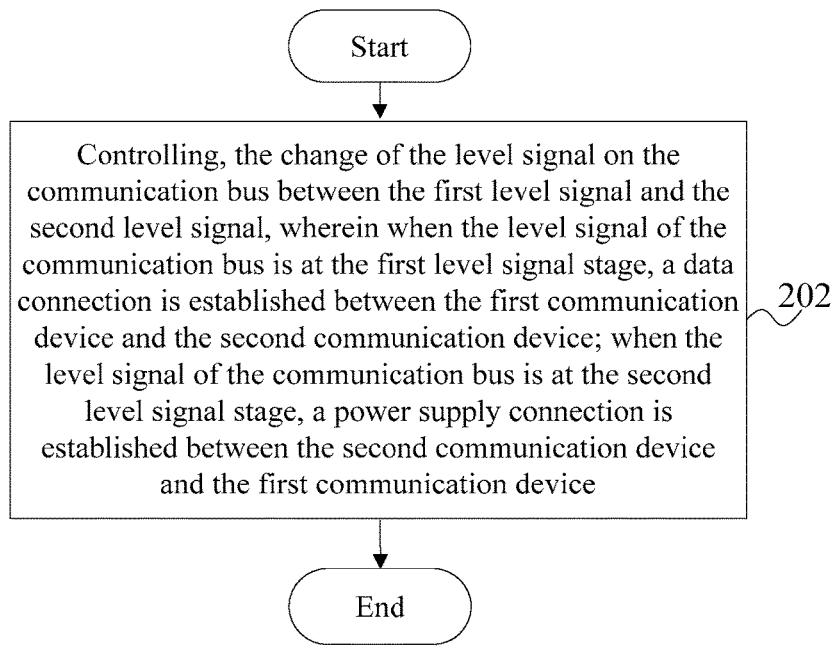
FIG. 2 shows a schematic flowchart of a control method for a communication device according to an embodiment of the present disclosure.

As shown in FIG. 2, according to one embodiment of the present disclosure, the present disclosure provides the first control method for a first communication device, and the first communication device and the second communication device are connected through a communication bus, and the control method comprises:

Step 202: controlling, the change of the level signal on the communication bus between the first level signal and the second level signal, and when the level signal of the communication bus is at the first level signal stage, a data connection is established between the first communication device and the second communication device; when the level signal of the communication bus is at the second level signal stage, a power supply connection is established between the second communication device and the first communication device.

An embodiment of the present disclosure provides a control method for a first communication device, specifically the first level signal and the second level signal do not transmit the first level signal and the second level signal simultaneously for the power supply connection and the data connection, respectively. Therefore, there will be no simultaneous power supply and data transmission on the communication bus. By controlling the level signal on the communication bus as the first level signal, this part of the time is reserved and the first communication device and the second communication device can exchange data, while by controlling the level signal on the communication bus as the second level signal, in order to supply power to the communication bus.

In one of the embodiments, the first communication device and the second communication device can be an indoor apparatus of an air conditioner, an outdoor unit, or a device such as a wire controller and a centralized controller, etc.

In one of the embodiments, the first communication device and the second communication device can also be refrigerators, TVs, washing machines and other electrical appliances, where in, the above electrical appliances can be connected through the communication bus to achieve overall power supply and control.

In the above-mentioned embodiment, since the data connection and the power supply connection do not appear at the same time, the communication bus using the above-mentioned control method does not need to set an inductance compared to the traditional Home Bus, which reduces the size of the controller and the driving ability on the air-conditioning communication system, and reduces the influence of the communication distance and anti-interference ability of the overall air-conditioning communication system and the cost of the controller.

In one embodiment of the present disclosure, the present disclosure provides the first control method for a first communication device, and the first communication device and the second communication device are connected through a communication bus, and the control method comprises: controlling, periodically make the level signal output to the communication bus change between the first level signal and the second level signal. In one embodiment, based on when the level signal of the communication bus is at the stage of the first level signal, a data connection is established between the second communication device and the first communication device. Based on when the level signal of the communication bus is at the stage of the second level signal, a power supply connection is established between the second communication device and the first communication device.

In the above-mentioned embodiment, since the data connection and the power supply connection do not appear at the same time, the communication bus using the above-mentioned control method does not need to set an inductance compared to the traditional Home Bus, which reduces the size of the controller and the driving ability on the air-conditioning communication system, and reduces the influence of the communication distance and anti-interference ability of the overall air-conditioning communication system and the cost of the controller.

In one embodiment, the step of controlling the level of the communication bus to change between the first level signal and the second level signal specifically comprises: at each cycle, controlling, the communication bus is maintained at the first level signal, and the communication bus is maintained at the duration of the first level signal being greater than or equal to the first duration; and controlling, the level on the communication bus is maintained at the second level signal; and the communication bus is maintained at the duration of the second level signal being greater than or equal to the second duration.

Figure 3:
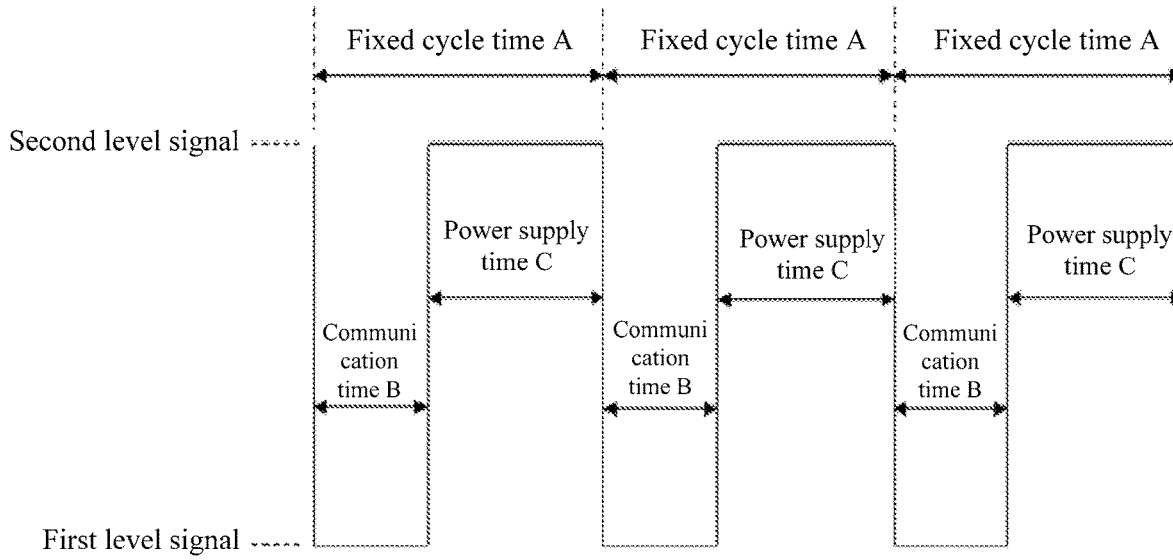
FIG. 3 shows a schematic diagram of a first level signal and a second level signal of an embodiment of the present disclosure.

As shown in FIG. 3, the fixed cycle time A comprises the communication time B corresponding to the first level signal and the power supply time C corresponding to the second level signal.

In this embodiment, by defining the duration of the first level signal and the duration of the second level signal on the communication bus, the power supply of the communication device on the communication bus can be maintained. In addition, since the switching of the first level signal and the second level signal is determined by the first duration and the second duration, by controlling the communication bus to change according to the cycle, the communication device communicating with the first communication device through the communication bus can calibrate its own clock deviation according to the cycle, to ensure that it is consistent with the clock signal of the first communication device, and reducing the first communication device and the second communication device have a power supply abnormality or a communication abnormality due to the inconsistency of their respective clocks.

In one embodiment of the present disclosure, taking Embodiment 2 as an example, the level signal on the communication bus is switched between the first level signal and the second level signal, at each cycle. It can be understood as the standby state without data, in this state, the level of the first level signal is higher than the level of the second level signal.

The control method for a communication device further comprises: adjusting, the first duration to the third duration, adjusting the second duration to the fourth duration, and the first duration is less than the third duration, the second duration is greater than the fourth duration, the sum of the first duration and the second duration, and the sum of the third duration and the fourth duration is the target duration.

In this embodiment, as described in the above document, the fixed cycle time consisting of the first duration and the second duration corresponding to the first level signal and the second level signal is a fixed value. If it is detected that the second communication device sends data to the first communication device, the first duration and the second duration can be adjusted accordingly, and the second communication device can transmit data quickly.

It can be understood that when the second communication device does not transmit data to the first communication device, the first duration is shorter than before the adjustment, and the second duration is longer than before the adjustment. At this time, the communication bus has a strong power supply capability.

For example, in the fixed cycle time A consisting of the first duration and the second duration corresponding to the first level signal and the second level signal, when there is no data in normal standby, the communication time B corresponding to the first level signal can be defined as 200 us, the power supply time C corresponding to the second level signal is defined as 800 us, and the fixed cycle time A is 1ms, during data transmission, that is, the time corresponding to the communication time B of the first level signal is adjusted to 400 us, the power supply time C corresponding to the second level signal is adjusted to 600 us.

In one embodiment of the present disclosure, the timing when the first communication device sends data to the second communication device is specifically limited. In one embodiment, the level signal of the communication bus is adjusted from the second level signal to the first level signal, and data is sent to the second communication device.

In this embodiment, when the first communication device sends data to the second communication device, the level signal on the communication bus is collected to determine whether the communication bus is at the opportunity to send data to the second communication device. In one embodiment, when the level signal on the communication bus is the second level signal, a power supply connection is established between the first communication device and the second communication device, if the first communication device wants to send data to the second communication device at this time, there will inevitably be a situation where data communication and power supply occur at the same time. In order to avoid the above situation, switch the level signal on the communication bus from the second level signal to the first level signal as the opportunity for the first communication device to send data to the second communication device, and to reduce the occurrence of the above situation.

In one embodiment, sending, data to the second communication device in the form of a first signal and/or a second signal, and the first signal comprises two parts of the second level signal and the third level signal, however, the sum of the duration of the second level signal and the duration of the third level signal is the target duration; the second signal comprises one part of the second level signal part, and the duration of the second level signal is the target duration.

Figure 4:
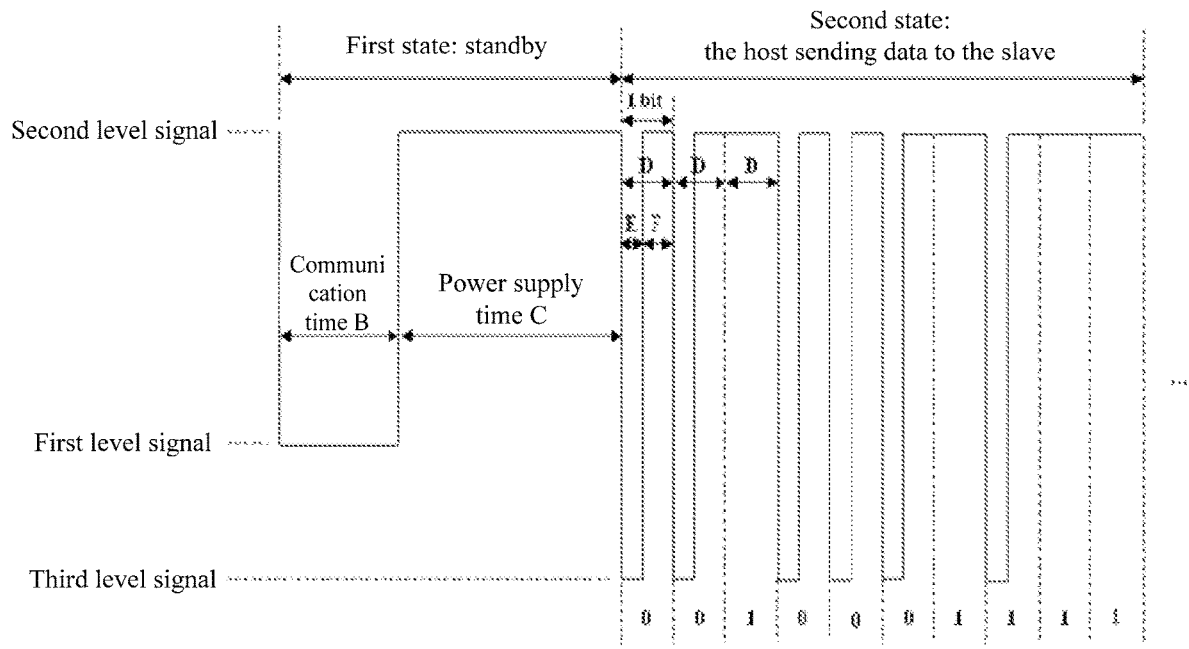
FIG. 4 shows a schematic diagram of a first level signal, a second level signal and a third level signal of an embodiment of the present disclosure.

For example, as shown in FIG. 4, the host is the first communication device in the present disclosure, the slave corresponds to the second communication device in the present disclosure, the first signal comprises the second level signal and the third level signal, and the sum of the duration E of the third level signal and the duration F of the second level signal is the target duration D; the second signal comprises the second level signal, and the duration of the second level signal is D, and the first signal and the second signal represent one bit.

In one of the embodiments, the target duration D is determined by the communication baud rate.

In the actual application process, as shown in FIG. 4, the level of the third level signal is lower than that of the first level signal and the second level signal. According to the actual application scenario, it can be selected as a value of zero.

In this embodiment, the first signal may correspond to binary data "0", and the second signal may correspond to binary data "1".

In one of the embodiments, when the first communication device sends data to the second communication device, it comprises the second level signal, so the first communication device can supply power to the communication bus. In particular, when the second signal corresponds to binary data "1", it can always supply power to the communication bus, ensuring the stability of communication and power supply.

In any one of the above-mentioned embodiments, based on the output of the first level signal to the communication bus, the level signal of the communication bus is detected, and the data sent by the second communication device is obtained.

In this embodiment, as can be seen from the above-mentioned content, when the communication bus outputs the first level signal, it belongs to the situation that the second communication device can establish a data connection with the first communication device. At this time, the voltage signal on the communication bus can be detected, and the data sent by the second communication device can be obtained. In this process, since the data connection and the power supply connection do not appear at the same time, the communication bus using the above-mentioned control method does not need to set an inductance compared to the traditional Home Bus, which reduces the size of the controller and the driving ability on the air-conditioning communication system, and reduces the influence of the communication distance and anti-interference ability of the overall air-conditioning communication system and the cost of the controller.

Figure 5:
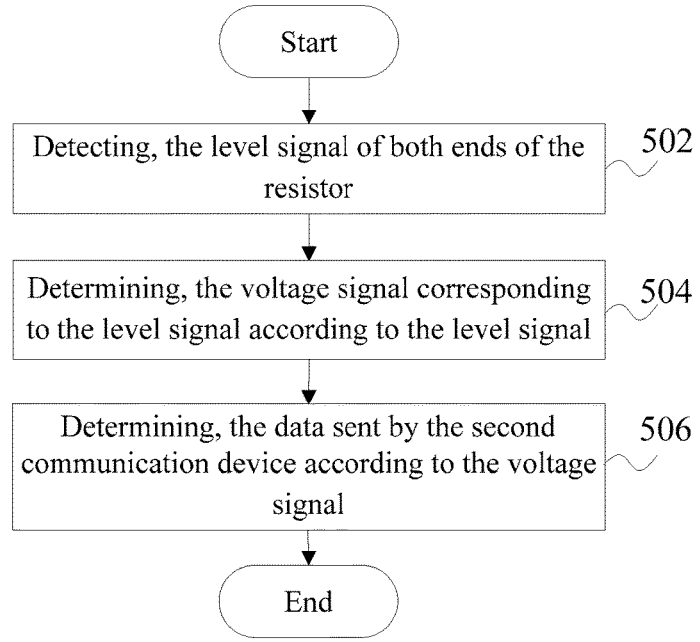
FIG. 5 shows a schematic flowchart of determining the data sent by the second communication device.

In one embodiment of the present disclosure, the content of the first communication device to receive the data sent by the second communication device is limited. In one embodiment, the first communication device comprises a resistor, and the resistor is connected in series in the loop where the communication bus is located. As shown in FIG. 5, the step of based on outputting the first level signal to the communication bus, detecting the level signal of the communication bus, obtaining the data sent by the second communication device specifically comprises:

Step 502, detecting, the level signal of both ends of the resistor;
Step 504, determining, the voltage signal corresponding to the level signal according to the level signal;
Step 506, determining, the data sent by the second communication device according to the voltage signal.

In this embodiment, since the first level signal on the communication bus is provided by the first communication device, only a resistor is connected in series, and the current provided by the second communication device will pass through the resistor and form a voltage on the resistor. In one embodiment, the voltage signal on the resistor can be obtained by detecting the level signal at both ends of the resistor and the difference between the level signal at both ends of the resistor, and the data sent by the second communication device is finally determined through the voltage signal.

Figure 7:
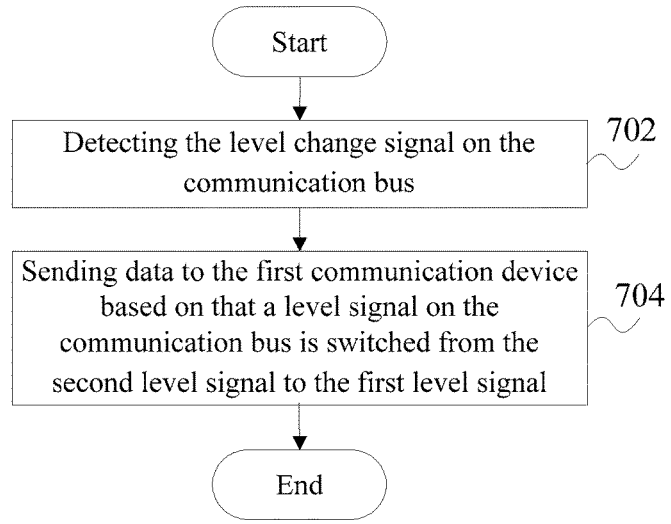
FIG. 7 shows a schematic flowchart of a control method for a communication device according to an embodiment of the present disclosure.

In one embodiment of the present disclosure, a control method for a second communication device is proposed, and the communication bus connects the second communication device and the first communication device, and the communication bus periodically switches between the first level signal and the second level signal. As shown in FIG. 7, the control method for a communication device comprises:

Step 702, detecting the level change signal on the communication bus;
Step 704, sending, data to the first communication device, based on that the level signal on the communication bus is switched from the second level signal to the first level signal.

In this embodiment, when the level signal of the communication bus is adjusted from the second level signal to the first level signal, the second communication device sends data to the first communication device, and to avoid the occurrence of the second communication device is in the first communication device and the second communication device is in the power supply connection when sending data to the first communication device. This reduces the occurrence of the communication bus using the above-mentioned control method does not need to set an inductance compared to the traditional Home Bus, which reduces the size of the controller and the driving ability on the air-conditioning communication system, and reduces the influence of the communication distance and anti-interference ability of the overall air-conditioning communication system and the cost of the controller.

In one of the embodiments, before the step of detecting, a level change signal on the communication bus further comprises: comparing a level signal of the communication bus with the first level signal, the second level signal, the third level signal, and the fourth level signal, to determine a level signal of the communication bus.

It can be understood that the first level signal is stored in the second communication device. Similarly, the second level signal, the third level signal and the fourth level signal are also stored in the second communication device.

In this embodiment, by comparing the level signal of the communication bus with the stored level signal, in order to distinguish the level signal on the communication bus, and reduce the occurrence of the first communication device receiving the wrong signal due to the abnormal level signal, the above-mentioned embodiment ensures the signal transmission reliability.

Figure 8:
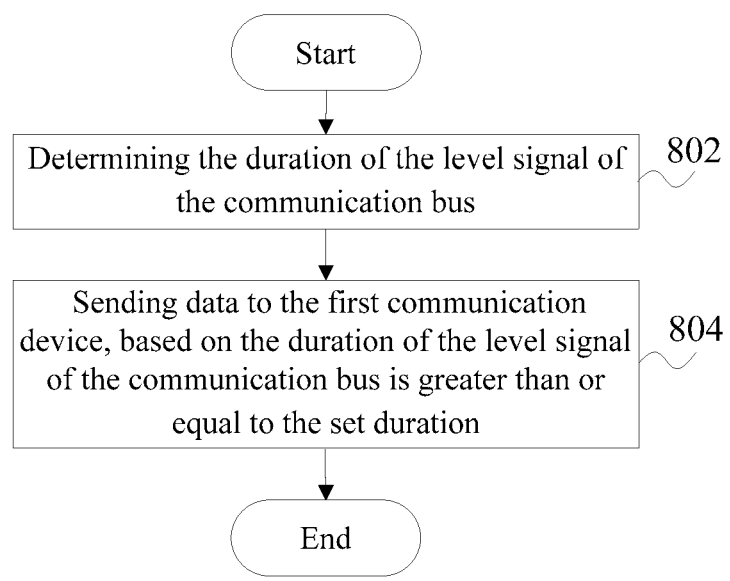
FIG. 8 shows a schematic flowchart of a control method for a communication device according to an embodiment of the present disclosure.

In any one of the above-mentioned embodiments, as shown in FIG. 8, before the step of sending data to the first communication device, further comprises:

Step 802, determining, the duration of the level signal of the communication bus;
Step 804, sending data to the first communication device based on the duration of the level signal of the communication bus is greater than or equal to the set duration.

In this embodiment, since the data sent by the first communication device to the second communication device and the data sent by the second communication device to the first communication device may be confused. In order to reduce the occurrence of the above situation, a limited value can be given for the duration of the third level signal in the data sent by the first communication device to the second communication device, that is, the set duration in the application. When the duration of the detected level signal is greater than or equal to the set duration, it is determined that the second communication device can send data to the first communication device. It can be seen that the above-mentioned embedding can reduce the probability of confusion in signal transmission and ensure the stability of signal transmission.

For example, the port output from the communication chip of the second communication device to the MCU is a high level 1 by default. If a waveform with data 0 is detected, it will output 0. There are two main points for the second communication device to distinguish whether the current communication bus is the first communication device to send data or to return the data status, first, distinguish the pulse width is with time, the pulse width of the first communication device sending data state E will be significantly smaller, and an interval range will be set; second, the first communication device sending the data state level is jumped from the second level signal to the first level signal, and the second communication device can return the data state is that the second level signal jumps to the third level signal.

In any one of the above-mentioned embodiments, the second communication device sends data to other second communication devices in the form of a third signal and/or a fourth signal, and the third signal comprises the first level signal, and the fourth signal comprises the fourth level signal. That is, the data transmission between any two second communication devices are realized in the form of the combination of the first level signal and the fourth level signal.

In the above-mentioned embodiment, by limiting the data transmission mode between any two second communication devices, the confusion of data exchange between each other is reduced, and the accurate transmission of data is ensured.

Figure 6:
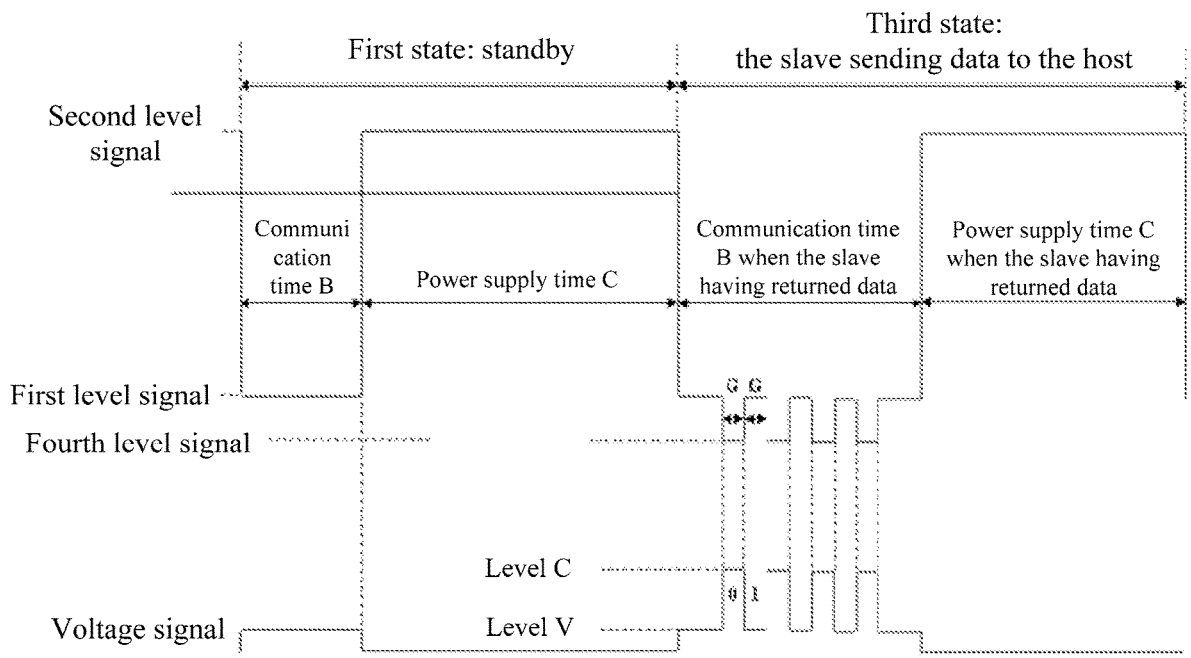
FIG. 6 shows a schematic diagram of a first level signal, a second level signal and a fourth level signal of an embodiment of the present disclosure.

In one embodiment, when the second communication device sends data to other second communication devices, it is transmitted by means of the third signal and/or the fourth signal. At this time, the level on the communication bus will change between the first level signal and the fourth level signal. As shown in FIG. 6, due to the existence of the resistor, the level signal at both ends of the resistor will fluctuate between the level C and the level V. According to this level, the data sent by the second communication device can be obtained, that is, "0" and "1" in the figure.

In this embodiment, since the power supply and communication are carried out in time-sharing, if a stable power supply level is to be obtained, a capacitor needs to be added on the power taking side, and the capacitance value of the capacitor is selected according to the size of the load. In addition, to prevent the voltage on the capacitor from flowing back into the bus, a one-way diode needs to be connected in series in front of the capacitor.

Figure 9:
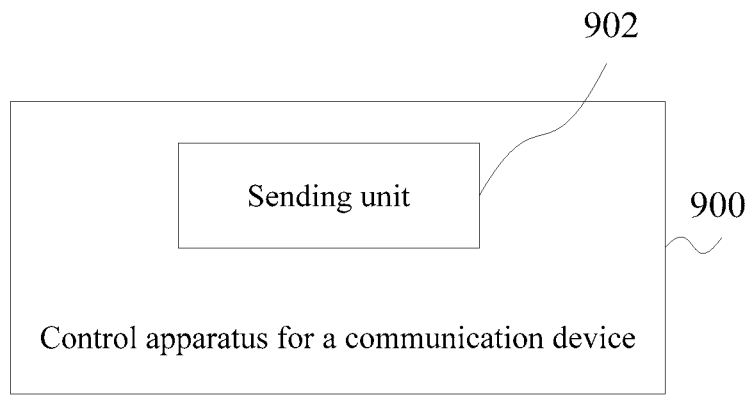
FIG. 9 shows a schematic block diagram of a control apparatus for a communication device according to an embodiment of the present disclosure.

In one embodiment of the present disclosure, as shown in FIG. 9, a first control apparatus 900 of the communication device for a first communication device is provided, a first communication device and a second communication device are connected through a communication bus, and the control apparatus 900 of the communication device comprises: a sending device 902 for controlling the change of the level signal on the communication bus between the first level signal and the second level signal, and when the level signal of the communication bus is at the first level signal stage, a data connection is established between the first communication device and the second communication device; when the level signal of the communication bus is at the second level signal stage, a power supply connection is established between the second communication device and the first communication device.

An embodiment of the present disclosure provides a control apparatus 900 for the communication device of the first communication device, the sending device 902 periodically outputs the first level signal and the second level signal, the first level signal and the second level signal do not transmit the first level signal and the second level signal simultaneously for the power supply connection and the data connection, respectively. Therefore, there will be no simultaneous power supply and data transmission on the communication bus. By controlling the level signal on the communication bus as the first level signal, this part of the time is reserved and the first communication device and the second communication device can exchange data, while by controlling the level signal on the communication bus as the second level signal, in order to supply power to the communication bus.

In the above-mentioned embodiment, since the data connection and the power supply connection do not appear at the same time, the communication bus using the above-mentioned control method does not need to set an inductance compared to the traditional Home Bus, which reduces the size of the controller and the driving ability on the air-conditioning communication system, and reduces the influence of the communication distance and anti-interference ability of the overall air-conditioning communication system and the cost of the controller.

In one of the embodiments, the first communication device and the second communication device can be an indoor apparatus of an air conditioner, an outdoor unit, or a device such as a wire controller and a centralized controller, etc.

In one of the embodiments, the first communication device and the second communication device can also be refrigerators, TVs, washing machines and other electrical appliances, where in, the above electrical appliances can be connected through the communication bus to achieve overall power supply and control.

In addition, the control apparatus 900 of the communication device in the above-mentioned embodiment provided by the present disclosure may also have the following additional features:

In any one of the above-mentioned embodiment, the step of the sending device 902 controlling the level of the communication bus to change between the first level signal and the second level signal specifically comprises: at each cycle, controlling, the communication bus is maintained at the first level signal, and the communication bus is maintained at the duration of the first level signal being greater than or equal to the first duration; and controlling, the level on the communication bus is maintained at the second level signal; and the communication bus is maintained at the duration of the second level signal being greater than or equal to the second duration.

As shown in FIG. 3, the fixed cycle time A comprises the communication time B corresponding to the first level signal and the power supply time C corresponding to the second level signal.

In this embodiment, by defining the duration of the first level signal and the duration of the second level signal on the communication bus, the power supply of the communication device on the communication bus can be maintained. In addition, since the switching of the first level signal and the second level signal is determined by the first duration and the second duration, by controlling the communication bus to change according to the cycle, the communication device communicating with the first communication device through the communication bus can calibrate its own clock deviation according to the cycle, to ensure that it is consistent with the clock signal of the first communication device, and reducing the first communication device and the second communication device have a power supply abnormality or a communication abnormality due to the inconsistency of their respective clocks.

In any one of the above-mentioned embodiments, the sending device 902 is also used to adjust the level signal of the communication bus from the second level signal to the first level signal and send data to the second communication device.

In this embodiment, when the first communication device sends data to the second communication device, the level signal on the communication bus is collected to determine whether the communication bus is at the opportunity to send data to the second communication device. In one embodiment, when the level signal on the communication bus is the second level signal, a power supply connection is established between the first communication device and the second communication device, if the first communication device wants to send data to the second communication device at this time, there will inevitably be a situation where data communication and power supply occur at the same time. In order to avoid the above situation, switch the level signal on the communication bus from the second level signal to the first level signal as the opportunity for the first communication device to send data to the second communication device, and to reduce the occurrence of the above situation.

In any one of the above-mentioned embodiment, sending, data to the second communication device in the form of a first signal and/or a second signal, and the first signal comprises two parts of the second level signal and the third level signal, however, the sum of the duration of the second level signal and the duration of the third level signal is the target duration; the second signal comprises one part of the second level signal part, and the duration of the second level signal is the target duration.

In any one of the above-mentioned embodiments, the sending device 902 is also used to output the first level signal to the communication bus, detect the level signal of the communication bus, and obtain the data sent by the second communication device.

In this embodiment, as can be seen from the above-mentioned content, when the communication bus outputs the first level signal, it belongs to the situation that the second communication device can establish a data connection with the first communication device. At this time, the voltage signal on the communication bus can be detected, and the data sent by the second communication device can be obtained. In this process, since the data connection and the power supply connection do not appear at the same time, the communication bus using the above-mentioned control method does not need to set an inductance compared to the traditional Home Bus, which reduces the size of the controller and the driving ability on the air-conditioning communication system, and reduces the influence of the communication distance and anti-interference ability of the overall air-conditioning communication system and the cost of the controller.

In any one of the above-mentioned embodiment, the sending device 902 executes the step of outputting the first level signal to the communication bus, detecting the level signal of the communication bus, and obtaining the data sent by the second communication device, specifically used for switching, the first duration to the third duration, and the second duration to a fourth duration, and the first duration is less than the third duration, the second duration is greater than the fourth duration, the sum of the first duration and the second duration, and the sum of the third duration and the fourth duration is the target duration.

In this embodiment, as described in the above document, the fixed cycle time consisting of the first duration and the second duration corresponding to the first level signal and the second level signal is a fixed value. If it is detected that the second communication device sends data to the first communication device, the first duration and the second duration can be adjusted accordingly, and the second communication device can transmit data quickly.

It can be understood that when the second communication device does not transmit data to the first communication device, the first duration is shorter, and the second duration is longer. At this time, the communication bus has a strong power supply capability.

For example, in the fixed cycle time A consisting of the first duration and the second duration corresponding to the first level signal and the second level signal, when there is no data in normal standby, the communication time B corresponding to the first level signal can be defined as 200 us, the power supply time C corresponding to the second level signal is defined as 800 us, and the fixed cycle time A is 1ms, during data transmission, that is, the time corresponding to the communication time B of the first level signal is adjusted to 400 us, the power supply time C corresponding to the second level signal is adjusted to 600 us.

In any of the above-mentioned embodiments, the first communication device comprises a resistor, and the resistor is connected in series in a loop where the communication bus is located, the sending device 902 executes the step of detecting, a level signal of the communication bus based on outputting the first level signal to the communication bus, to obtain the data sent by the second communication device, specifically comprising: detecting, level signals at both ends of the resistor; determining, a voltage signal corresponding to the level signal according to the level signal; and determining, the data sent by the second communication device according to the voltage signal.

In this embodiment, since the first level signal on the communication bus is provided by the first communication device, only a resistor is connected in series, and the current provided by the second communication device will pass through the resistor and form a voltage on the resistor. In one embodiment, the voltage signal on the resistor can be obtained by detecting the level signal at both ends of the resistor and the difference between the level signal at both ends of the resistor, and the data sent by the second communication device is finally determined through the voltage signal.

In this embodiment, since the first level signal on the communication bus is provided by the first communication device, only a resistor is connected in series, and the current provided by the second communication device will pass through the resistor and form a voltage on the resistor. In one embodiment, the voltage signal on the resistor can be obtained by detecting the level signal at both ends of the resistor and the difference between the level signal at both ends of the resistor, and the data sent by the second communication device is finally determined through the voltage signal.

In one embodiment, sending, data to the second communication device in a form of the first signal and/or the second signal, and the first signal comprises the second level signal and a third level signal, and the sum of duration of the second level signal and duration of the third level signal is target duration, the second signal comprises the second level signal, and duration of the second level signal is the target duration.

For example, as shown in FIG. 4, the host is the first communication device in the present disclosure, the slave corresponds to the second communication device in the present disclosure, the first signal comprises the second level signal and the third level signal, and the sum of the duration E of the third level signal and the duration F of the second level signal is the target duration D; the second signal comprises the second level signal, and the duration of the second level signal is D, and the first signal and the second signal represent one bit.

In one of the embodiments, the target duration D is determined by the communication baud rate.

In the actual application process, as shown in FIG. 4, the level of the third level signal is lower than that of the first level signal and the second level signal. According to the actual application scenario, it can be selected as a value of zero.

In this embodiment, the first signal may correspond to binary data "0", and the second signal may correspond to binary data "1".

In one of the embodiments, when the first communication device sends data to the second communication device, it comprises the second level signal, so the first communication device can supply power to the communication bus. In particular, when the second signal corresponds to binary data "1", it can always supply power to the communication bus, ensuring the stability of communication and power supply.

In the above-mentioned embodiment, by limiting the first communication device and the second communication device to send data according to the corresponding form, the confusion of data exchange between each other is reduced, and the accurate transmission of data is ensured.

Figure 10:
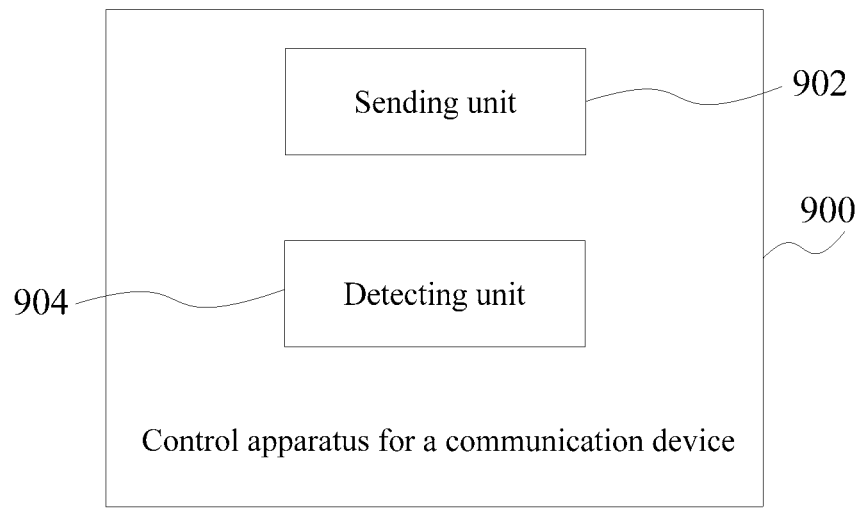
FIG. 10 shows a schematic block diagram of a control apparatus for a communication device according to an embodiment of the present disclosure.

In one embodiment of the present disclosure, as shown in FIG. 10, a control apparatus 900 of a communication device is provided, a second communication device and a first communication device are connected through a communication bus, and the communication bus switches between the first level signal and the second level signal periodically, the control apparatus 900 of the communication device comprises: a detecting device 904 for detecting a level change signal on the communication bus; and a sending device 902 for sending data to the first communication device based on that a level signal on the communication bus is switched from the second level signal to the first level signal.

In this embodiment, when the level signal of the communication bus is adjusted from the second level signal to the first level signal, the second communication device sends data to the first communication device, and to avoid the occurrence of the second communication device is in the first communication device and the second communication device is in the power supply connection when sending data to the first communication device. This reduces the occurrence of the communication bus using the above-mentioned control method does not need to set an inductance compared to the traditional Home Bus, which reduces the size of the controller and the driving ability on the air-conditioning communication system, and reduces the influence of the communication distance and anti-interference ability of the overall air-conditioning communication system and the cost of the controller.

In any one of the above-mentioned embodiment, before the detecting device 904 executes the step of detecting, a level change signal on the communication bus, further comprises: comparing a level signal of the communication bus with the stored the first level signal, the second level signal, the third level signal, and the fourth level signal, to determine a level signal of the communication bus.

It can be understood that the first level signal is stored in the second communication device. Similarly, the second level signal, and the third level signal are also stored in the second communication device.

In this embodiment, by comparing the level signal of the communication bus with the stored level signal, in order to distinguish the level signal on the communication bus, and reduce the occurrence of the first communication device receiving the wrong signal due to the abnormal level signal, the above-mentioned embodiment ensures the signal transmission reliability.

In any one of the above-mentioned embodiment, before the step of sending data to the first communication device, the sending device 902 also used for determining, duration of the level signal of the communication bus; and sending data to the first communication device, according to that duration of the level signal of the communication bus is greater than or equal to a set duration.

In this embodiment, since the data sent by the first communication device to the second communication device and the data sent by the second communication device to the first communication device may be confused. In order to reduce the occurrence of the above situation, a limited value can be given for the duration of the third level signal in the data sent by the first communication device to the second communication device, that is, the set duration in the application. When the duration of the detected level signal is greater than or equal to the set duration, it is determined that the second communication device can send data to the first communication device. It can be seen that the above-mentioned embedding can reduce the probability of confusion in signal transmission and ensure the stability of signal transmission.

In any one of the above-mentioned embodiments, the second communication device sends data to other second communication devices in the form of a third signal and/or a fourth signal, and the third signal comprises the first level signal, and the fourth signal comprises the fourth level signal. That is, the second communication device realizes the data transmission between any two second communication devices in the form of the combination of the first level signal and the fourth level signal.

In the above-mentioned embodiment, by limiting the first communication device and the second communication device between any two second communication devices to execute data transmission respectively in the corresponding forms, the confusion of data exchange between each other is reduced, and the accurate transmission of data is ensured.

In one embodiment, when the second communication device sends data to other second communication devices, it is transmitted by means of the third signal and/or the fourth signal. At this time, the level on the communication bus will change between the first level signal and the fourth level signal. As shown in FIG. 6, due to the existence of the resistor, the level signal at both ends of the resistor will fluctuate between the level C and the level V. According to this level, the data sent by the second communication device can be obtained, that is, "0" and "1" in the figure.

In this embodiment, since the power supply and communication are carried out in time-sharing, if a stable power supply level is to be obtained, a capacitor needs to be added on the power taking side, and the capacitance value of the capacitor is selected according to the size of the load. In addition, to prevent the voltage on the capacitor from flowing back into the bus, a one-way diode needs to be connected in series in front of the capacitor.

Figure 11:
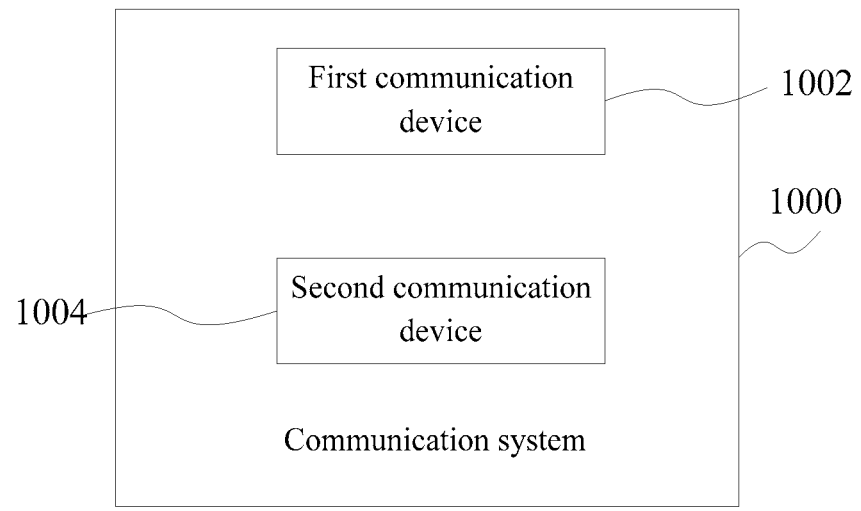
FIG. 11 shows a schematic block diagram of a communication system of an embodiment of the present disclosure.

In one embodiment of the present disclosure, as shown in FIG. 11, a communication system 1000 is provided, comprising: a first communication device 1002, and the first communication device 1002 executes the steps of the control method for a communication device according to any one of the embodiments; and a second communication device 1004, and the second communication device 1004 executes the steps of the control method for a communication device according to any one of the embodiments; and a communication bus, and the first communication device 1002 and the second communication device 1004 are connected through the communication bus.

The embodiment of the present disclosure provides a communication system comprising a communication bus and a first communication device 1002 and a second communication device 1004 connected by the communication bus. In one embodiment, the first communication device 1002 executes the steps of the control method for a communication device according to any one of the embodiments, and the second communication device 1004 executes the steps of the control method for a communication device according to any one of the embodiments. Therefore, the communication system in the present disclosure has all the beneficial effects of any one of the above-mentioned control methods for a communication device.

In one embodiment, since the data connection and the power supply connection do not appear at the same time, the communication bus using the above-mentioned control method does not need to set an inductance compared to the traditional Home Bus, which reduces the size of the controller and the driving ability on the air-conditioning communication system, and reduces the influence of the communication distance and anti-interference ability of the overall air-conditioning communication system and the cost of the controller.

Figure 1:
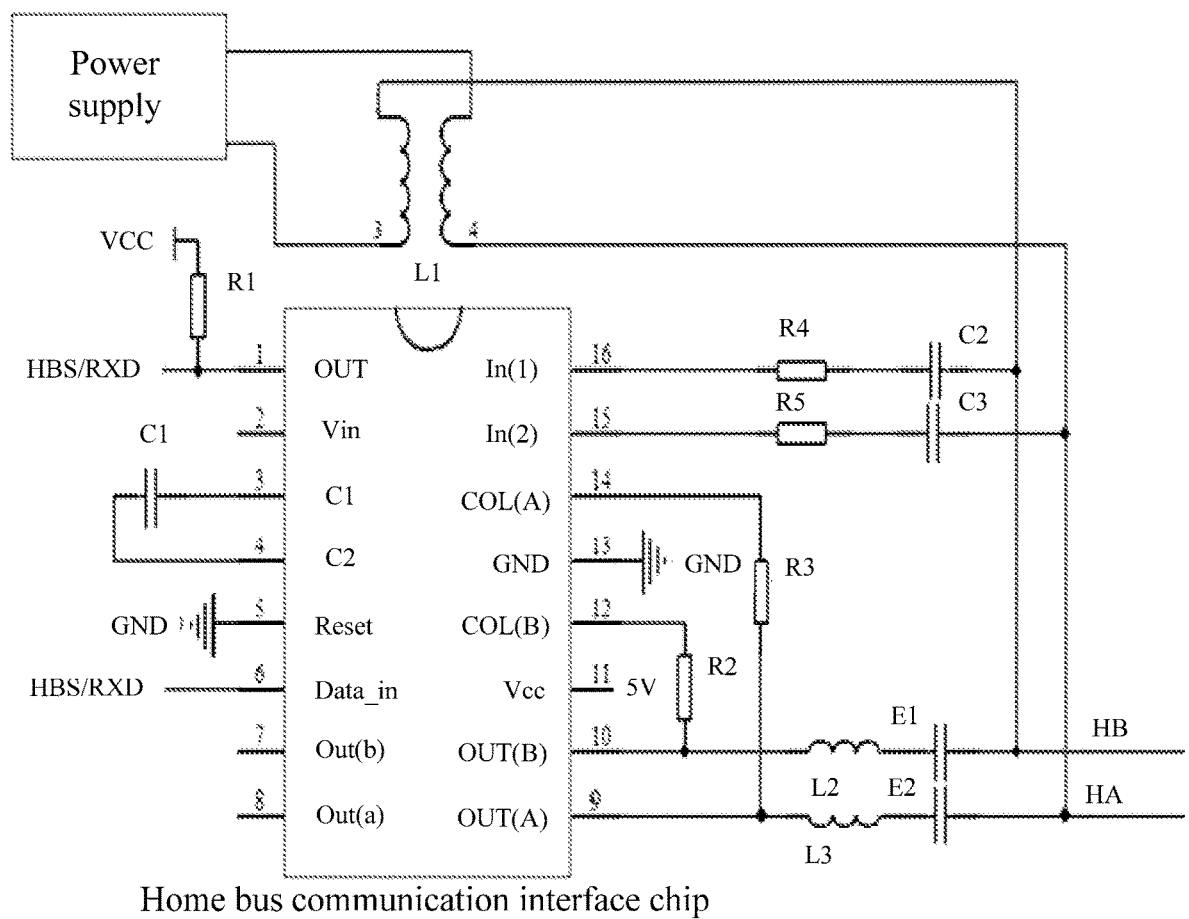
FIG. 1 shows a schematic circuit diagram of a Home Bus communication node in the relevant embodiment.

In any one of the above-mentioned embodiments, it can be understood that not the controller of the Home Bus communication node in FIG. 1 can be used, and it is also applicable to the scheme of using the PLC bus for power supply and communication.

In one of the embodiments, the first communication device and the second communication device can be an indoor apparatus of an air conditioner, an outdoor unit, or a device such as a wire controller and a centralized controller, etc.

In one of the embodiments, the first communication device and the second communication device can also be refrigerators, TVs, washing machines and other electrical appliances, where in, the above electrical appliances can be connected through the communication bus to achieve overall power supply and control.

In one embodiment of the present disclosure, a readable storage medium is provided comprising a processor, a memory, and programs or instructions stored in the memory and running on the processor, the programs or instructions, when executed by the processor, implement the steps of the control method for a communication device of any of the above.

An embodiment of the present disclosure provides a readable storage medium on which the steps of any one of the above-mentioned control methods for a communication device are stored. Therefore, the readable storage medium has all the beneficial effects of the control method for a communication device of any of the above, and will not be repeated here.

In the description of the present disclosure, it should be understood that the orientation or position relationships indicated by the terms "upper", "lower", "left", "right", "front", "back" and the like are the orientation or position relationships based on what is shown in the drawings, are merely for the convenience of describing the present disclosure and simplifying the description, and do not indicate or imply that the device or apparatus referred to must have a particular direction and is constructed and operated in a specific orientation, and thus cannot be understood as the limitation of the present disclosure. The terms "first", "second", and "third" are used for the purpose of description only, and cannot be understood as indicating or implying relative importance; and the term "plurality" means two or more, unless otherwise expressly defined. The terms "installing", "connected", "connection", "fixing" and the like should be understood in a broad sense. For example, "connection" may be a fixed connection, a removable connection or an integral connection; and "connected" may refer to direct connection or indirect connection through an intermediary.

In the description of the present specification, the descriptions of the terms "one embodiment", "some embodiments" and "exemplary embodiments" and the like mean that specific features, structures, materials or characteristics described in conjunction with the embodiment(s) or example (s) are comprised in at least one embodiment or example of the present disclosure. In the specification, the schematic representation of the above terms does not necessarily refer to the same embodiment or example. In some embodiments, the specific features, structures, materials or characteristics described may be combined in an adapted manner in any one or more embodiments or examples.

What is claimed is:

1. A control method for a first communication device, wherein the first communication device and a second communication device are connected through a communication bus, and the control method comprises:

periodically outputting, a first level signal and a second level signal to the communication bus,
wherein the second communication device establishes a data connection with the first communication device based on that a level signal on the communication bus is the first level signal, and the second communication device establishes a power supply connection with the first communication device based on that the level signal on the communication bus is the second level signal; and
detecting, a level signal of the communication bus based on outputting the first level signal to the communication bus, to obtain the data sent by the second communication device;
sending, data to the second communication device based on that a level signal on the communication bus is switched from the second level signal to the first level signal;
sending, data to the second communication device in a form of a first signal and/or a second signal;
wherein the first signal comprises the second level signal and a third level signal and the sum of duration of the second level signal and duration of the third level signal is target duration,
the second signal comprises the second level signal, and duration of the second level signal is target duration;
wherein the periodically outputting the first level signal and the second level signal to the communication bus specifically comprises:
outputting, the first level signal to the communication bus, at each cycle; and
determining, duration of the communication bus outputting the first level signal is greater than or equal to a first duration, and outputting the second level signal to the communication bus,
wherein duration of the first communication device outputting the second level signal to the communication bus is greater than or equal to a second duration.

2. The control method according to claim 1, wherein the detecting, a level signal of the communication bus based on outputting the first level signal to the communication bus, to obtain the data sent by the second communication device, further comprising:

switching, the first duration to a third duration, and the second duration to a fourth duration, wherein the first duration is less than the third duration, the second duration is greater than the fourth duration, the sum of the first duration and the second duration, and the sum of the third duration and the fourth duration is target duration.

3. The control method according to claim 1, wherein the first communication device comprises a resistor, and the resistor is connected in series in a loop where the communication bus is located, the detecting, a level signal of the communication bus based on outputting the first level signal to the communication bus, to obtain the data sent by the second communication device, specifically comprises:

detecting, level signals at both ends of the resistor;

determining, a voltage signal corresponding to the level signal according to the level signal; and determining, the data sent by the second communication device according to the voltage signal.

4. A control method for a second communication device, wherein the second communication device and a first communication device are connected through a communication bus, and the first communication device periodically outputs a first level signal and a second level signal to the communication bus, the control method comprises:

comparing, a level signal of the communication bus with the stored the first level signal, the second level signal, a third level signal, and a fourth level signal, to determine a level signal of the communication bus;

sending, data to the second communication device in a form of a third signal and/or a fourth signal, based on that a level signal on the communication bus is switched from the second level signal to the fourth level signal;

detecting, a level change signal on the communication bus;

determining, duration of the level signal of the communication bus; and sending, data to the first communication device based on that the duration of the level signal of the communication bus is greater than or equal to a set duration;

sending, data to the first communication device based on that a level signal on the communication bus is switched from the second level signal to the first level signal; and detecting, a level signal of the communication bus based on outputting the first level signal to the communication bus, to obtain the data sent by the second communication device;

wherein the second communication device establishes a data connection with the first communication device based on that a level signal on the communication bus is the first level signal, and the second communication device establishes a power supply connection with the first communication device based on that the level signal on the communication bus is the second level signal.

5. A control apparatus for a first communication device, wherein the first communication device and a second communication device are connected through a communication bus, and the control apparatus comprises:

a sending device for periodically outputting a first level signal and a second level signal to the communication bus; and a detecting device for detecting a level change signal on the communication bus;

wherein the second communication device establishes a data connection with the first communication device based on that a level signal on the communication bus is the first level signal, and the second communication device establishes a power supply connection with the first communication device based on that a level signal on the communication bus is the second level signal;

wherein the detecting device is configured for:

detecting a level signal of the communication bus based on outputting the first level signal to the communication bus in order to obtain the data sent by the second communication device;

wherein the sending device is further configured for:

sending data to the second communication device based on that a level signal on the communication bus is switched from the second level signal to the first level signal; and sending data to the second communication device in a form of a first signal and/or a second signal;

wherein the first signal comprises the second level signal and a third level signal and the sum of duration of the second level signal and duration of the third level signal is target duration;

wherein the second signal comprises the second level signal, and duration of the second level signal is target duration.

6. A control apparatus for a second communication device, wherein the second communication device and a first communication device are connected through a communication bus, and the first communication device periodically outputs a first level signal and a second level signal to the communication bus, the control apparatus comprises:

a detecting device for detecting a level change signal on the communication bus; and a sending device for sending data to the first communication device based on that a level signal on the communication bus is switched from the second level signal to the first level signal;

before sending data to the first communication device, the sending device is further configured for:

determining duration of the level signal of the communication bus; and sending data to the first communication device based on that the duration of the level signal of the communication bus is greater than or equal to a set duration;

wherein before detecting the level change signal on the communication bus, the detecting device is further configured for comparing a level signal of the communication bus with the stored the first level signal, the second level signal, a third level signal, and a fourth level signal, to determine a level signal of the communication bus; and wherein the sending device is further configured for sending data to the second communication device in a form of a third signal and/or a fourth signal, based on that a level signal on the communication bus is switched from the second level signal to the fourth level signal.

* * * * *